UNITED STATES PATENT OFFICE.

ALFRED GUSTAV CARL STERLEY, OF HAMBURG, GERMANY.

PROCESS OF PRESERVING EGGS.

995,198. Specification of Letters Patent. Patented June 13, 1911.

No Drawing. Application filed July 26, 1910. Serial No. 574,008.

*To all whom it may concern:*

Be it known that I, ALFRED GUSTAV CARL STERLEY, merchant, a subject of the German Emperor, and resident of No. 82 Caffamacherreihe, Hamburg, Germany, have invented certain new and useful Improvements in Processes of Preserving Eggs, of which the following is a specification.

The existing processes of preserving eggs by treating them with antiseptics, have not proved satisfactory in every respect. This is probably due to the fact that the action of the antiseptics is not sufficient to preserve the contents of the eggs from decomposition by bacteria over a protracted period. Some of the antiseptics that are in use, do not sufficiently close the pores of the egg shells and thus completely shut off the contents of the eggs from atmospheric air. Other antiseptics render the egg shells soft and crumbling, so that the eggs burst in boiling, or the eggs acquire an unnatural appearance, and above all, an unpleasant flavor.

It has now been discovered that eggs treated with a solution of odorless benzoic acid can be kept fresh for a long period. The most suitable solvent for this purpose is alcohol. The eggs are immersed in the concentrated alcoholic solution of benzoic acid, so that the solution enters the pores of the egg shells. None of the solution penetrates through the skin of the egg into the egg itself even if the egg be left for a long period in the solution. As the alcohol slowly evaporates, benzoic acid is deposited in the pores and on the egg shells without formation of crystals, in the form of a firmly adhering coherent coating which closes the pores and forms a white deposit on the surface of the egg shells, that does not alter the egg shells or injure the natural appearance of the eggs in any way. Eggs treated in this manner retain the flavor and smell of fresh eggs even after long storage. The benzoic acid preserves the contents of the eggs for a long period from going bad by reason of its antifermentative and physical properties, the former preventing the development of bacteria, and the latter acting to shut off the contents of the eggs mechanically from the air.

The improved process is carried out substantially as follows:—The eggs to be preserved are immersed for a short time, say for a few seconds, in a solution composed of one part of benzoic acid in about four parts of rectified alcohol of say 80 per cent. strength. The eggs are then stored where the alcohol can evaporate slowly. By immersion in the solution of benzoic acid, an egg takes up about one-half of a gram of the solution which is absorbed by the egg shell, and about one-tenth of a gram of benzoic acid remains in the egg shell after the alcohol has evaporated.

The improved process takes but little time to carry out. It is extremely simple and reliable, and its use does not require any special appliances. Above all, its results are very satisfactory, because eggs preserved by its means will not go bad even at temperatures of 30 to 40 degrees centigrade. By its means, eggs can be conveyed over long distances without spoiling on the way.

What I claim is:—

1. Process of preserving eggs which consists in dipping them for a short time in a concentrated alcoholic solution of benzoic acid, withdrawing the eggs from said solution, and causing the alcohol to immediately evaporate.

2. Process of preserving eggs which consists in dipping them for a few seconds in a concentrated solution composed of about one part of benzoic acid and about four parts of alcohol, withdrawing the eggs from said solution and causing the alcohol to immediately evaporate.

Signed by me at Hamburg this 12th day of July 1910.

ALFRED GUSTAV CARL STERLEY.

Witnesses:
 AUGUST WENK,
 ERNST H. L. MUMMENHOFF.

---

Copies of this patent may be obtained for five cents each, by addressing the "Commissioner of Patents, Washington, D. C."